United States Patent
Hajati (10) Patent No.: US 10,162,417 B2
(45) Date of Patent: Dec. 25, 2018

(54) METHOD OF TUNING A HAPTIC ACTUATOR AND RELATED APPARATUS

(71) Applicant: Apple Inc., Cupertino, CA (US)

(72) Inventor: Arman Hajati, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 797 days.

(21) Appl. No.: 14/819,865

(22) Filed: Aug. 6, 2015

(65) Prior Publication Data

US 2017/0038840 A1 Feb. 9, 2017

(51) Int. Cl.
*G06F 3/01* (2006.01)
*G06F 1/16* (2006.01)

(52) U.S. Cl.
CPC .............. *G06F 3/016* (2013.01); *G06F 1/163* (2013.01); *G06F 3/011* (2013.01)

(58) Field of Classification Search
CPC . G06F 3/01; G06F 3/011; G06F 3/016; G06F 3/044; G06F 3/16; G06F 3/163; F16F 7/10; F16F 7/1005; F16F 7/104; F16F 7/1011; F16F 7/108; F16F 7/116
See application file for complete search history.

(56) References Cited

U.S. PATENT DOCUMENTS

| | | | |
|---|---|---|---|
| 5,959,451 A * | 9/1999 | De Torfino | G01V 3/15 324/236 |
| 8,169,402 B2 * | 5/2012 | Shahoian | G06F 3/016 345/156 |
| 2006/0123900 A1 * | 6/2006 | Sugita | G01H 9/00 73/204.26 |
| 2013/0236337 A1 * | 9/2013 | Gummin | F04B 43/043 417/412 |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |

FOREIGN PATENT DOCUMENTS

| | | |
|---|---|---|
| WO | 2013169299 A1 | 11/2013 |
| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

OTHER PUBLICATIONS

Hajati, Arman, U.S. Appl. No. 14/819,910, filed Aug. 6, 2015.
Product Specification Sheet: Geeplus, VIBRO1 Vibration Actuator, 2 pages, www.geeplus.biz, downloaded on Jul. 15, 2015.

* cited by examiner

*Primary Examiner* — Van T Trieu
(74) *Attorney, Agent, or Firm* — Allen, Dyer, Doppelt, + Gilchrist, P.A.

(57) ABSTRACT

A method of tuning a haptic actuator that includes a housing having an initial ferromagnetic mass, at least one coil carried by the housing, and a field member movable within the housing responsive to the at least one coil, wherein the haptic actuator operative as a resonator and has an initial quality (Q) factor, may include measuring the initial Q factor of the haptic actuator. The method may include determining a desired ferromagnetic mass for the housing to tune the initial Q factor to a desired Q factor. The method may also include changing the initial ferromagnetic mass of the housing to the desired ferromagnetic mass. Another embodiment changes the ferromagnetic mass of the field member.

26 Claims, 12 Drawing Sheets

METHOD OF TUNING A HAPTIC ACTUATOR AND RELATED APPARATUS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A method is directed to tuning a haptic actuator that may include a housing having an initial ferromagnetic mass, at least one coil carried by the housing, and a field member movable within the housing responsive to the at least one coil. The haptic actuator may be operative as a resonator and having an initial quality (Q) factor. The method may include determining the initial Q factor of the haptic actuator. The method may also include determining a desired ferromagnetic mass for the housing to tune the initial Q factor to a desired Q factor, and changing the initial ferromagnetic mass of the housing to the desired ferromagnetic mass. Accordingly, the haptic actuator may be tuned to a desired Q factor, for example, to reduce friction caused by misalignments and/or non-uniformity of magnetic forces, the reduced friction of which may reduce failure rates of the haptic actuator.

The method may include changing the initial ferromagnetic mass of the housing comprises adding ferromagnetic mass to the housing, for example. The method may also include changing the initial ferromagnetic mass of the housing comprises removing ferromagnetic mass from the housing. Removing ferromagnetic mass from the housing may include laser ablating ferromagnetic mass from the housing, for example.

Changing the initial ferromagnetic mass of the housing may include adding a ferromagnetic body to the housing. The desired Q factor may be in a range between 8 and 15, for example.

The housing may have a top and a bottom. Changing the initial ferromagnetic mass of the housing may include changing the initial mass of one of the top and bottom of the housing to the desired ferromagnetic mass, for example. The field member may include at least one permanent magnet and at least one mass coupled thereto, for example.

Another method aspect is directed to a method of a method of tuning a haptic actuator that includes a housing, at least one coil carried by the housing, and a field member movable within the housing responsive to the at least one coil and having an initial ferromagnetic mass. The haptic actuator may be operative as a resonator and having an initial quality (Q) factor. The method may include determining the initial Q factor of the haptic actuator, and determining a desired ferromagnetic mass for the field member to tune the initial Q factor to a desired Q factor. The method may also include changing the initial ferromagnetic mass of the field member to the desired ferromagnetic mass.

A device aspect is directed to an apparatus for tuning a haptic actuator that includes a housing having an initial ferromagnetic mass, at least one coil carried by the housing, and a field member movable within the housing responsive to the at least one coil. The haptic actuator may be operative as a resonator and have an initial quality (Q) factor. The apparatus may include at least one sensor, a mass changing device, and a controller. The controller may be capable of cooperating with the at least one sensor to determine the initial an initial quality (Q) factor of the haptic actuator, and determining a desired ferromagnetic mass for the housing to tune the initial Q factor to a desired Q factor. The controller may also be capable of cooperating with the mass changing device to change the initial ferromagnetic mass of the housing to the desired ferromagnetic mass.

Another device aspect is directed to an apparatus for tuning a haptic actuator that includes a housing having an initial ferromagnetic mass, at least one coil carried by the housing, and a field member movable within the housing responsive to the at least one coil and having an initial ferromagnetic mass. The haptic actuator may be operative as a resonator and have an initial quality (Q) factor. The apparatus may include at least one sensor, a mass changing device, and a controller. The controller may be capable of cooperating with the at least one sensor to determine the initial an initial quality (Q) factor of the haptic actuator, and determining a desired ferromagnetic mass for the field member to tune the initial Q factor to a desired Q factor. The controller may also be capable of cooperating with the mass changing device to change the initial ferromagnetic mass of the field member to the desired ferromagnetic mass.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation and numerals in increments of 100 are used to refer to like elements in different embodiments.

Figure 1:
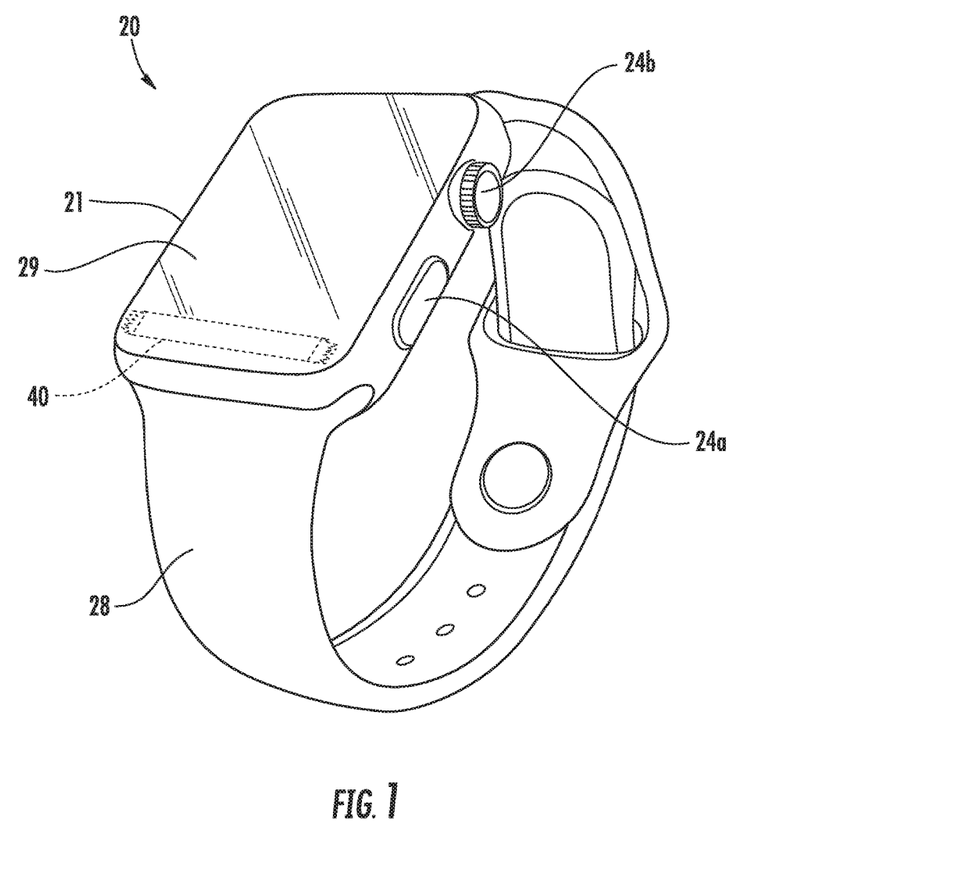
FIG. 1 is a perspective view of an electronic device including a haptic actuator according to an embodiment.
Figure 2:
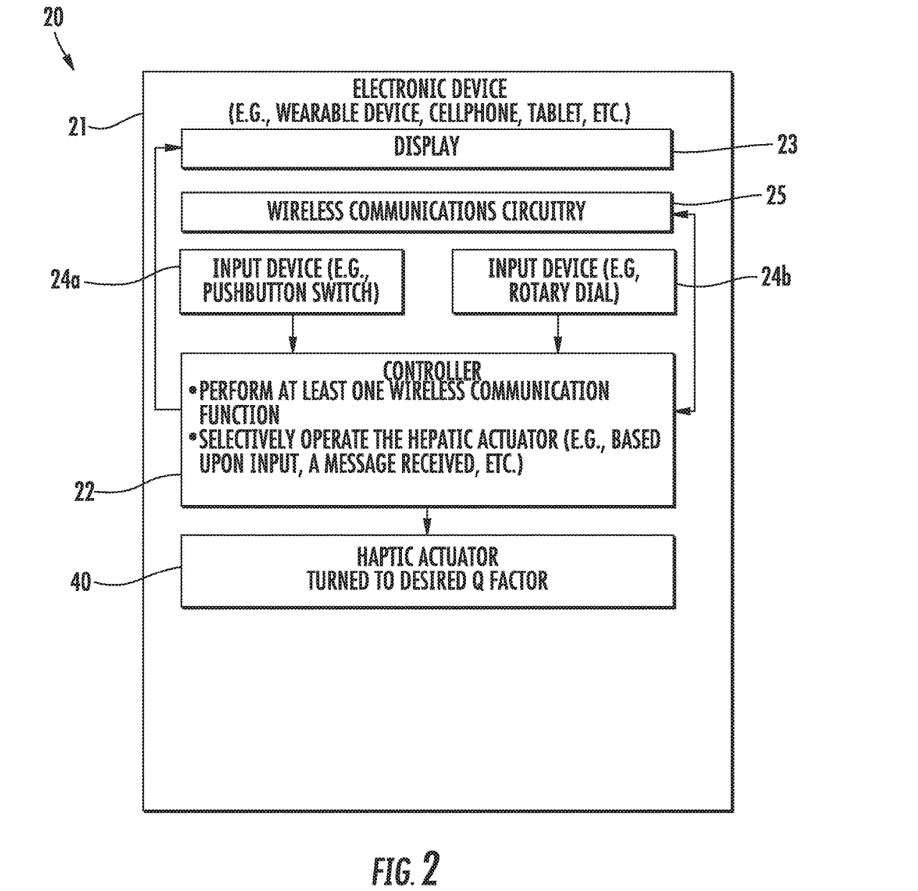
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a moveable body or masses between first and second positions.

While a controller 22 is described, it should be understood that the controller 22 may include one or more of a processor and other circuitry to perform the functions described herein.

Figure 3:
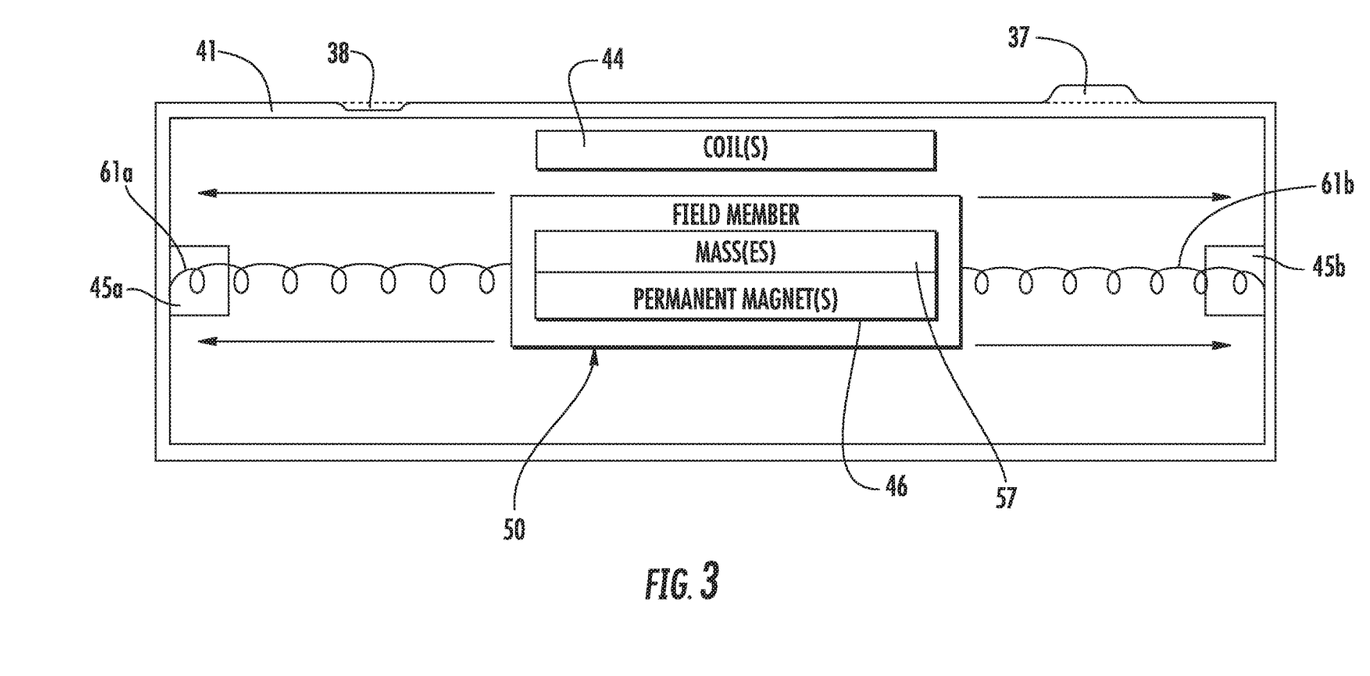
FIG. 3 is a schematic side view of the haptic actuator of FIG. 1.

Referring now additionally to FIG. 3, the haptic actuator 40 includes an actuator housing 41 and a coil 44 carried by the actuator housing. Of course, there may be more than one coil carried by the housing 41. The actuator housing 41 includes ferromagnetic material.

A field member 50 is movable within the housing 21 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator. The field member 50 may include a mass 57. The mass 57 may be shaped for or have a particular mass amount for a particular haptic sensation or desired application. Of course, there may be more than one mass 57.

The field member 50 also includes a permanent magnet 46 adjacent the coil 44. More than one permanent magnet 46 may be included. The permanent magnet 46 is illustratively coupled to the mass 57.

It should be understood that in some embodiments, the electromagnetic (or coil 44) may be swapped with the permanent magnet 46. In other words, the field member may include the coil 44 and the mass 57 that is movable within the housing 21 and the permanent magnet may be stationary within the housing.

The haptic actuator 40 also includes biasing members between the field member 50 and the actuator housing 41, which are illustratively in the form of springs 61a, 61b defining part of a suspension system. The biasing members may be other types of biasing members, for example, coil springs, leaf springs, and flexures. The springs may also or additionally include magnetic springs that, through interaction with the permanent magnet(s) 46 and/or ferritic parts of the actuator housing 41, if any, store and amplify the energy in the form of elastic/magnetic energy. The springs 61a, 61b provide biasing of the field member in an initial at-rest position.

The suspension system may also include shafts, linear/angular bearings, sliding bearings, flexures, multi-bar linkage mechanisms, and other springs that may enable motion of the field member 50 in the desired direction (e.g. X axis in a linear actuator or around a certain axis in an angular actuator) while constraining motion in other degrees of freedom. The suspension system may include other and/or additional components for maintaining the suspension of the field member 50 as well as constrain movement of the field member.

The haptic actuator 40 also includes mechanical limit stops 45a, 45b defined between the housing 41 and the field member 50. The mechanical limit stops 45a, 45b limit the movement of the field member to a desired range and/or stop the field member 50. It will be appreciated by those skilled in the art that the mechanical limit stops 45a, 45b can be separate from actuator housing 41 or part of the actuator housing.

As will be appreciated by those skilled in the art, the haptic actuator is operative as a resonator, and has an initial quality (Q). A Q factor is a dimensionless parameter that describes the damping of a resonator and characterizes its bandwidth relative to its center frequency. The Q factor of the haptic actuator 40 may change over time. For example, dropping the haptic actuator 40 may cause a change in the Q factor. The performance of the haptic actuator 40 may also be significantly impacted by any imperfection in part geometry, material properties, and assembly, which may make production yield relatively low and relatively expensive.

Moreover, even a "perfect" haptic actuator (e.g. at the actuator level) may become problematic (e.g. noisy, sticky, etc.) after installation in the system as a result of interactions (mechanical, magnetic, etc) between the actuator and system or electronic device (e.g., dropping as noted above).

However, it may be not be feasible to replace the haptic actuator after being assembled in the electronic device. After assembly in the electronic device, any problem with the haptic actuator (e.g., loud acoustic noise, stiction, low Q factor) would generally mean failure of the system.

A friction force generally comes from the imbalance of the force on the moving part (i.e., field member 50) of the haptic actuator as a result of misalignment of parts and assembly, non uniformity of magnetic forces, etc. As a result of this imbalance/misalignment, a normal force may be exerted, for example, by any bearings, and proportionally, a friction force on the field member 50. This increased friction force may be the dominant damping force and may determine the Q factor, breakaway voltage, and how "sticky" any vibe is. Accordingly, if the total force is reduced, for example, by compensating for the misalignment forces with external forces, and/or changing the magnetic boundary condition, the forces may be balanced to reduce any friction.

Figure 4:
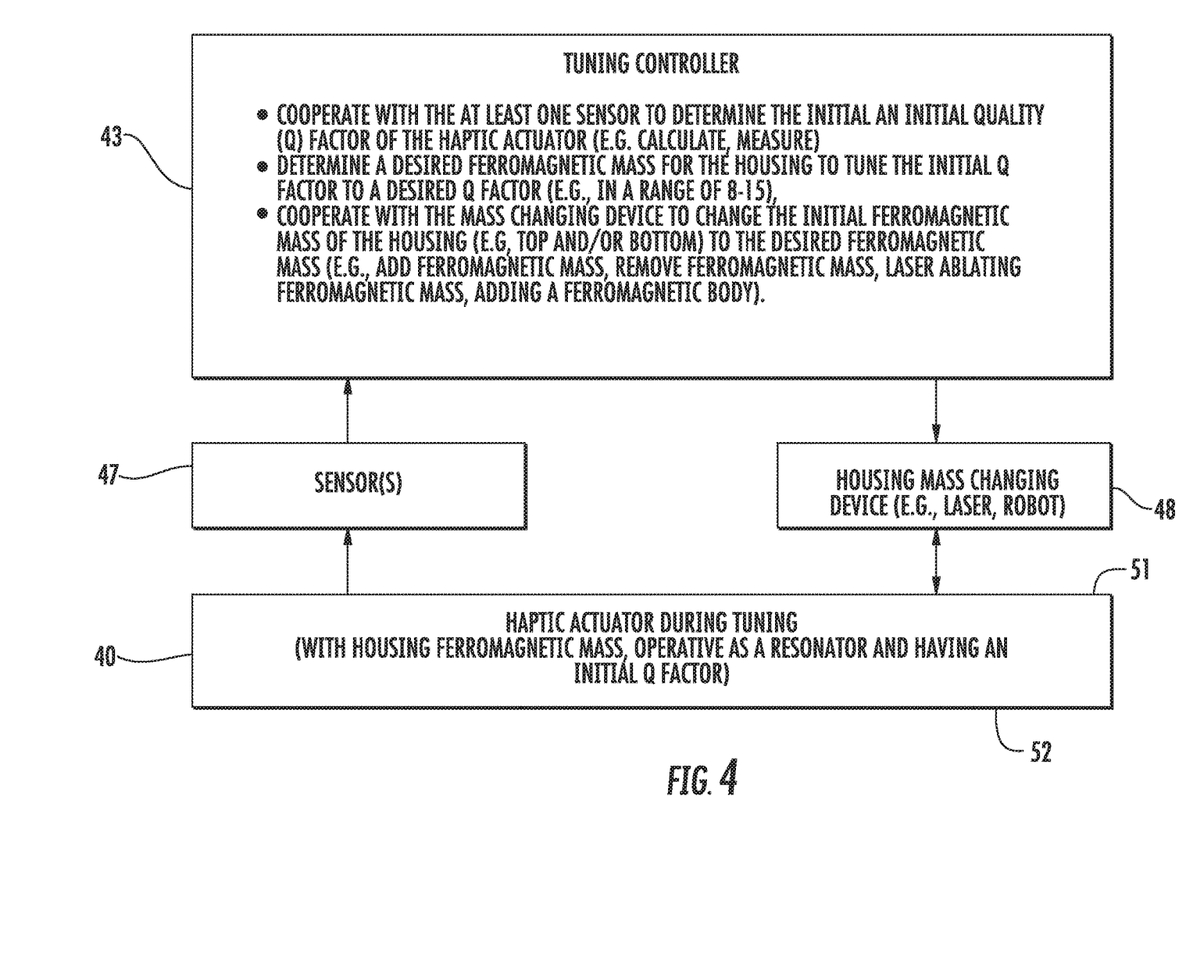
FIG. 4 is schematic block diagram of an apparatus for tuning a haptic actuator according to an embodiment.
Figure 5:
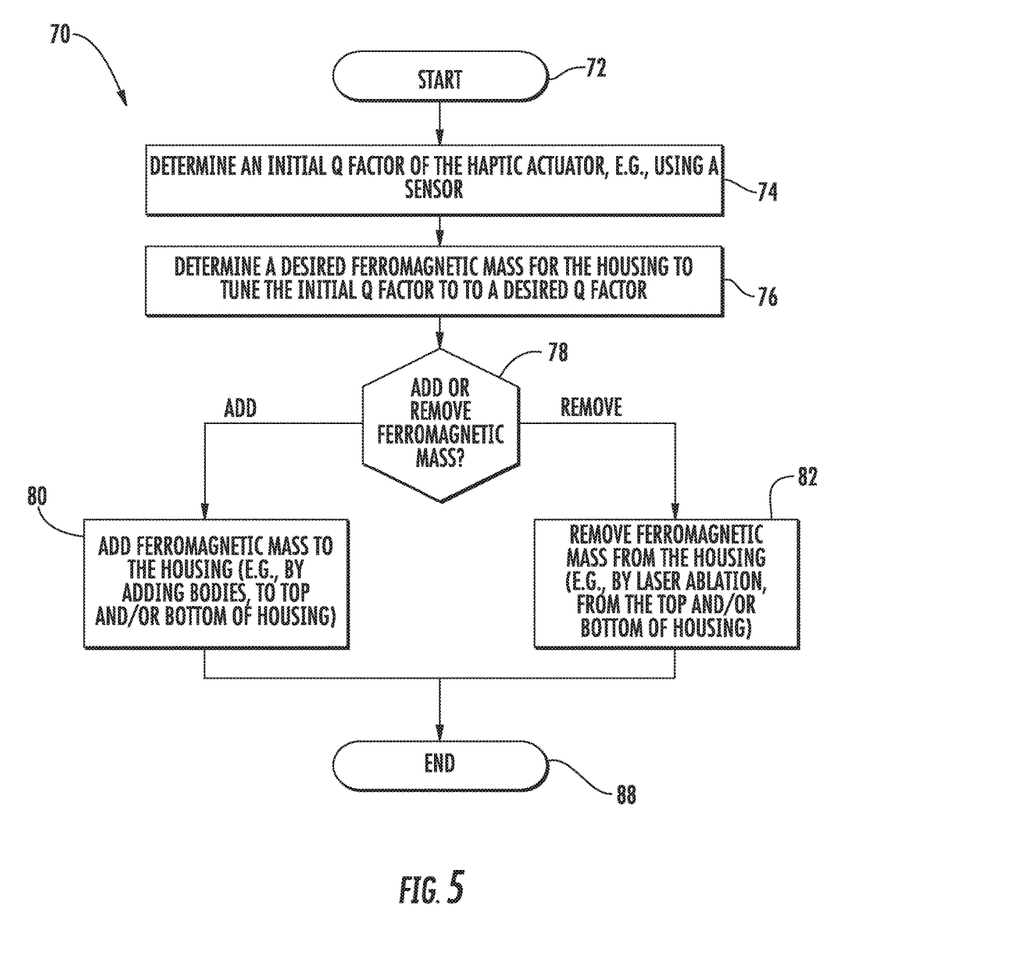
FIG. 5 is a flow diagram illustrating a method of tuning a haptic actuator using the apparatus of FIG. 4.

Referring now additionally to FIG. 4 and the flowchart 70 in FIG. 5, an apparatus and method for tuning the haptic actuator 40 to a desired Q factor, for example, post-assembly, will now be described. Beginning at Block 72, the method includes, at Block 74, determining the initial Q factor of the haptic actuator 40. This may be done with a sensor 47 coupled to a tuning controller 43. The sensor 47 may measure one or more parameters of the haptic actuator 40 which may be used by the tuning controller 43 to calculate the initial Q factor. More than one sensor 47 may be used to determine the initial Q factor.

At Block 76, using the tuning controller 43, a desired ferromagnetic mass is determined for the actuator housing 41 to tune the initial Q factor to a desired Q factor. The desired Q factor may be predetermined based upon the type of haptic actuator, for example. The desired Q factor may be between 8 and 15, for example. Other Q factor ranges may be desired, for example, based upon the type, shape, and application of the haptic actuator.

The tuning controller 43 cooperates with a mass changing device 48 to change the initial ferromagnetic mass of the actuator housing 41 to the desired ferromagnetic mass. More particularly, at Block 78, the tuning controller 43 determines whether the initial ferromagnetic mass of the housing is to be increased or decreased. Where it has been determined that the initial ferromagnetic mass is to be increased (Block 78), the tuning controller 43 cooperates with the mass changing device 48 to add ferromagnetic mass, for example in the form of ferromagnetic bodies 37 (FIG. 3), to the actuator housing 41 (Block 80). In some embodiments, ferromagnetic mass may be added to top 51 and/or bottom 52 of the actuator housing 41 which may include ferromagnetic material, for example. The corresponding mass changing device 48 may be a device that positions and secures the ferromagnetic bodies 37 to the actuator housing 41, for example, at one or more locations, for example, at the corners, that may affect the ferromagnetic mass to achieve the desired Q factor. Of course, ferromagnetic mass may be added anywhere on the actuator housing 41. The process of adding ferromagnetic mass to the actuator housing 41 may be conceptually described along the lines of adding weights to tires of an automobile for balancing the tire.

Where it has been determined that the initial ferromagnetic mass is to be decreased (Block 78), the tuning controller 43 cooperates with the mass changing device 48 to remove ferromagnetic mass from the actuator housing 41 (Block 82) leaving a recess 38 (FIG. 3) in the housing. The corresponding mass changing device 48 may be a laser, for example, for laser ablating portions of the actuator housing 41. Ferromagnetic mass may be removed at one or more locations that may affect the ferromagnetic mass to achieve the desired Q factor, for example, from the top 51 and/or bottom 52 of the actuator housing 41, which may include ferromagnetic material. The portions of the actuator housing 41 to be laser ablated may be predetermined, for example, the corners of the actuator housing 41. Of course, ferromagnetic mass may be removed from anywhere on the actuator housing 41.

In some embodiments, ferromagnetic mass may be added to one side or portion of the actuator housing 41 while ferromagnetic mass may be removed from another side or portion of the actuator housing to achieve the desired Q factor. The method ends at Block 88.

Simulations were conducted using haptic actuators that had a relatively large misalignment force that reduced the effective Q factor from ~14 down to 4-7. During simulations, a relatively small magnet was added to the actuator housing. The position of the small magnet was moved until a relatively large, for example, a maximized, Q factor was achieved. Thus, an effective Q factor of 12.5 was able to be achieved (friction Q of 80-120 considering the electromechanical damping) or basically almost no friction in comparison with EM damping.

Figure 6:
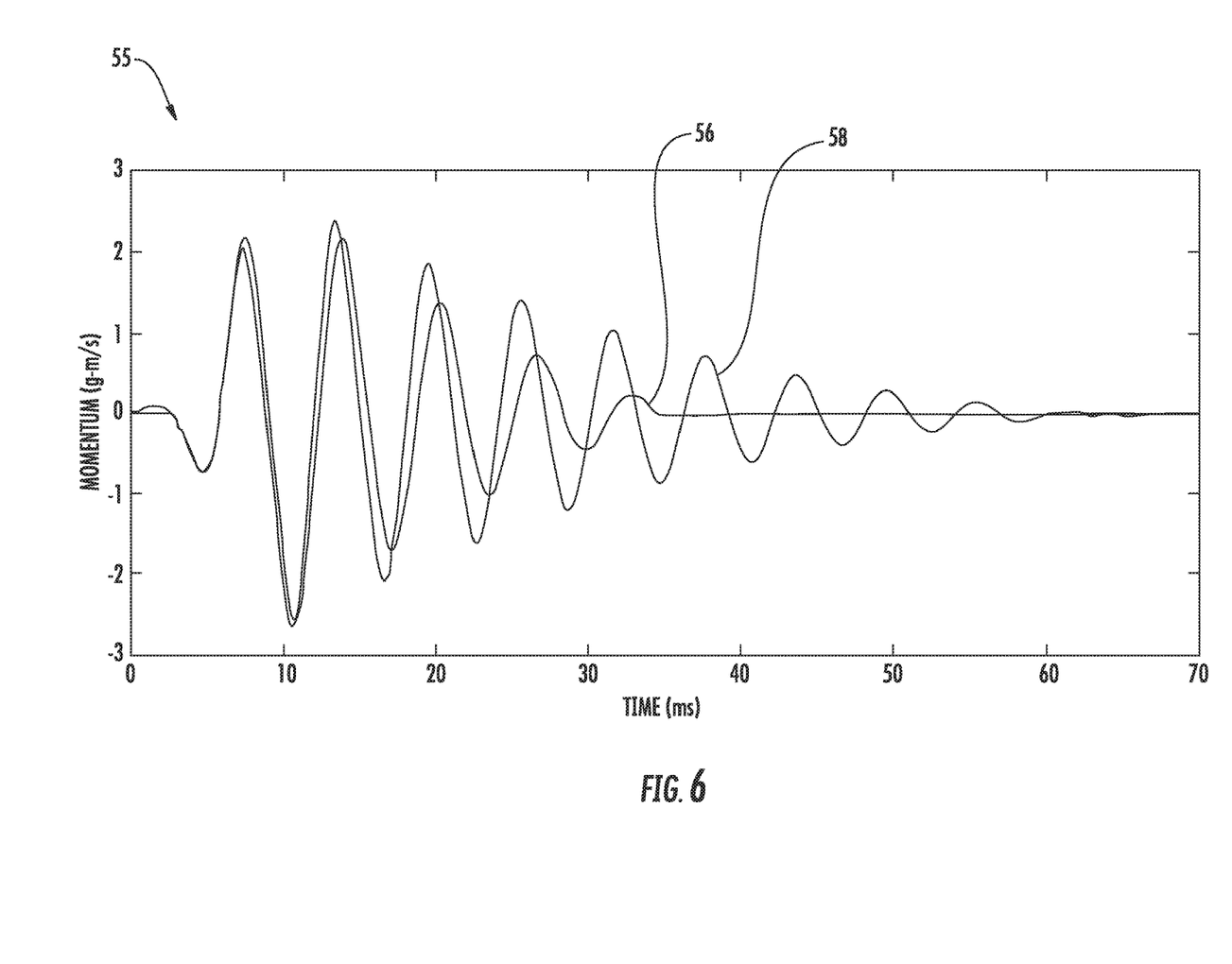
FIG. 6 is a graph of illustrating simulated momentum of an untuned haptic actuator and an untuned haptic actuator according to an embodiment.

Referring to the graph 55 in FIG. 6, the line 56 shows the simulated momentum for haptic actuator without tuning, while the line 58 shows the same simulated momentum for haptic actuator with tuning. Illustratively, the friction force and breakaway voltage is reduced by an order of magnitude and haptic actuator oscillates down to relatively small amplitude.

Figure 7:
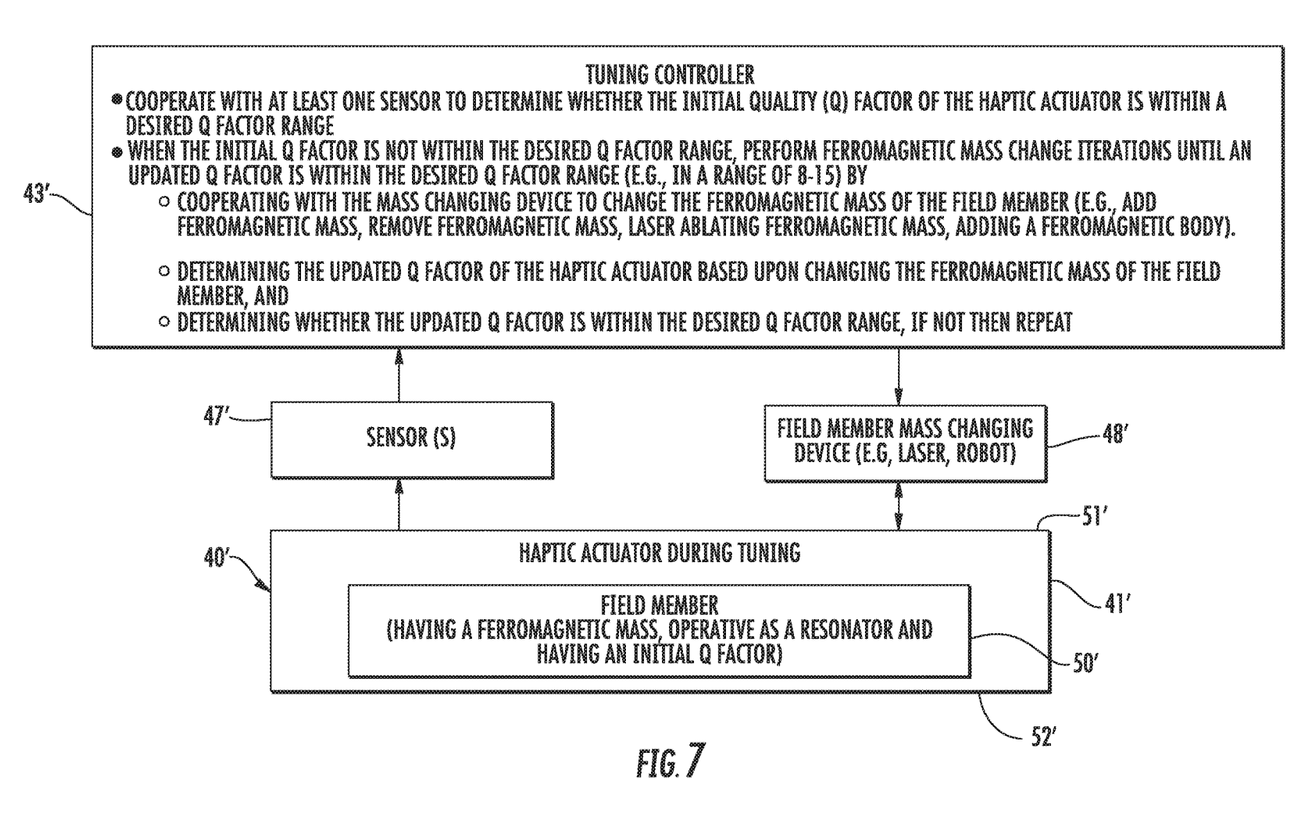
FIG. 7 is a schematic block diagram of an apparatus for tuning a haptic actuator according to another embodiment.
Figure 8:
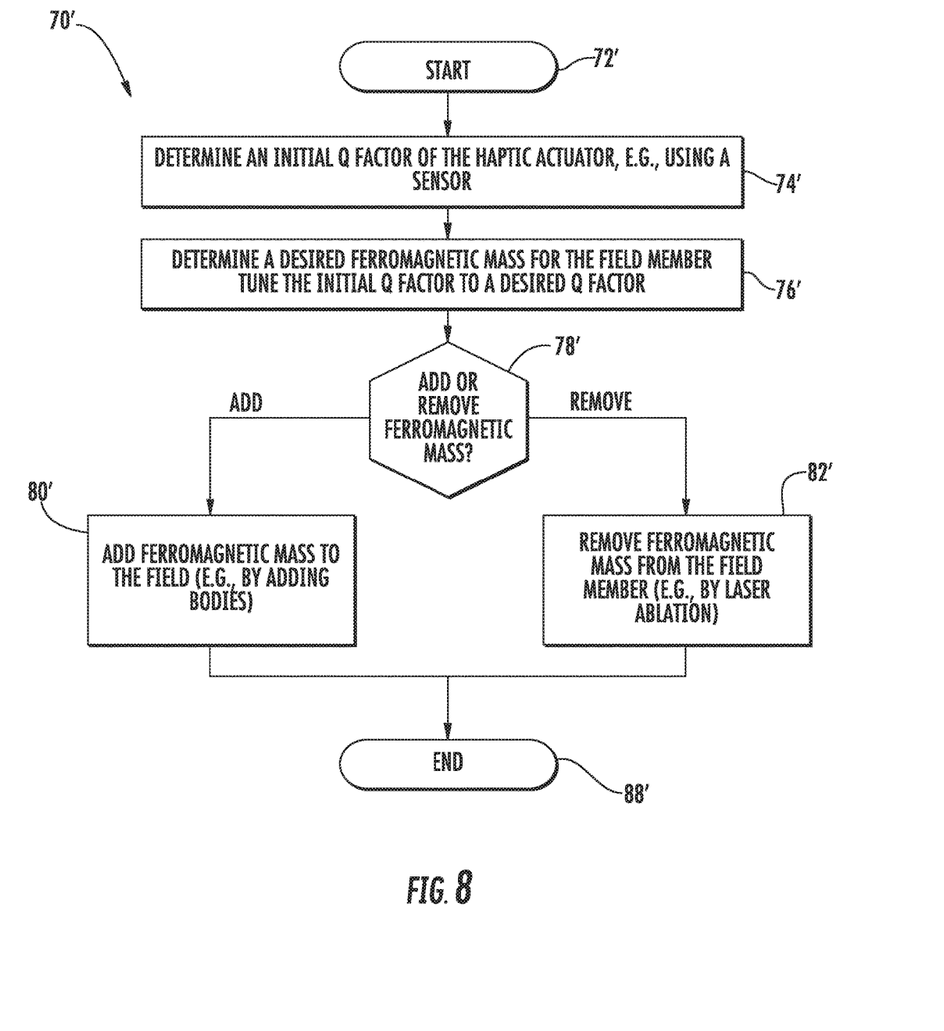
FIG. 8 is a flow diagram illustrating a method of tuning a haptic actuator using the apparatus of FIG. 7.

Referring now to FIG. 7 and the flowchart 70' in FIG. 8, another embodiment of an apparatus and method for tuning the haptic actuator 40' to a desired Q factor will now be described. Beginning at Block 72', the method includes, at Block 74', determining the initial Q factor of the haptic actuator 40'. This may be done with the sensor 47' coupled to a tuning controller 43' as described above.

At Block 76', using the tuning controller 43', a desired ferromagnetic mass is determined for the field member 50' to tune the initial Q factor to a desired Q factor. The desired Q factor may be predetermined based upon the type of haptic actuator, for example. The desired Q factor may be between 8 and 15, for example. Other Q factor ranges may be desired, for example, based upon the type, shape, and application of the haptic actuator.

The tuning controller 43' cooperates with a mass changing device 48' to change the initial ferromagnetic mass of the field member 50' to the desired ferromagnetic mass. More particularly, at Block 78', the tuning controller 43' determines whether mass is to be added or removed from the field member 50' relative to the initial ferromagnetic mass. Where it has been determined that the initial ferromagnetic mass is to be increased (Block 78'), the tuning controller 43' cooperates with the mass changing device 48' to add ferromagnetic mass, for example in the form of ferromagnetic bodies, to the field member 50' (Block 80'). The corresponding mass changing device 48' may be a device that positions and secures the ferromagnetic bodies to the field member 50', for example, at one or more locations, for example, the corners, that may affect the ferromagnetic mass to achieve the desired Q factor. Of course, ferromagnetic mass may be added anywhere on the field member 50'.

Where it has been determined that the initial ferromagnetic mass is to be decreased (Block 78'), the tuning controller 43' cooperates with the mass changing device 48' to remove ferromagnetic mass from the field member 50' (Block 82'). The corresponding mass changing device 48' may be a laser, for example, for laser ablating portions of the field member 50'. Ferromagnetic mass may be removed at one or more locations that may affect the ferromagnetic mass to achieve the desired Q factor. The portions of the field member 50' to be laser ablated may be predetermined, for example.

In some embodiments, ferromagnetic mass may be added to one side or portion of the field member 50' while ferromagnetic mass may be removed from another side or portion of the field member to achieve the desired Q factor. The method ends at Block 88'.

Figure 9:
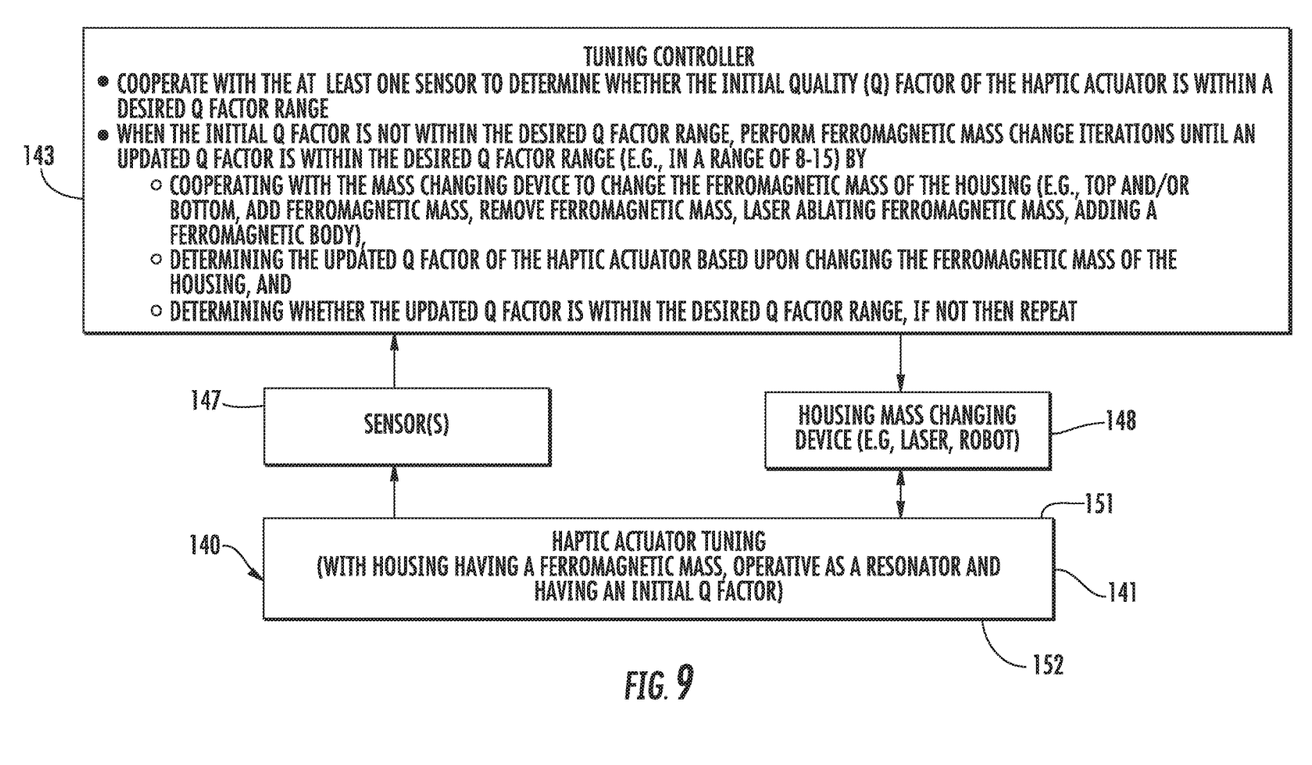
FIG. 9 is a schematic block diagram of an apparatus for tuning a haptic actuator according to another embodiment.
Figure 10:
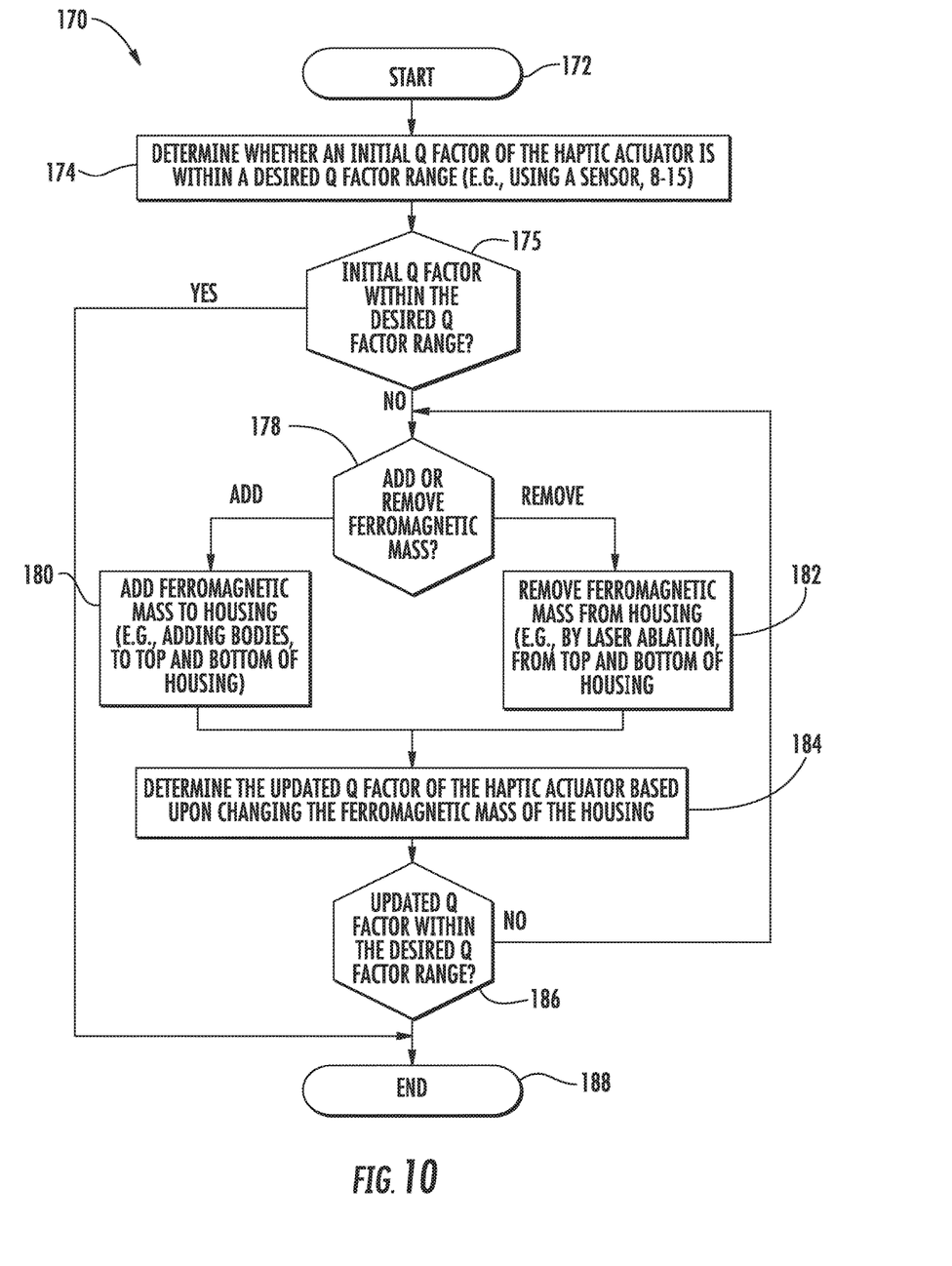
FIG. 10 is a flow diagram illustrating a method of tuning a haptic actuator using the apparatus of FIG. 9.

Referring now additionally to FIG. 9 and the flowchart 170 in FIG. 10, another apparatus and method for tuning the haptic actuator 140 to a desired Q factor, for example, post-assembly, will now be described. Beginning at Block 172, the method includes, at Block 174, determining whether the initial Q factor of the haptic actuator 140 is within a desired Q factor range. This may be done with a sensor 147 coupled to a tuning controller 143. The sensor 147 may measure one or more parameters of the haptic actuator 140 which may be used by the tuning controller 143 to calculate the initial Q factor. More than one sensor 147 may be used to determine the initial Q factor.

Similarly to the embodiments described above, a desired Q factor range may be determined based upon the type of haptic actuator, for example. The desired Q factor may be between 8 and 15, for example. Other Q factor ranges may be desired, for example, based upon the type, shape, and application of the haptic actuator.

If the initial Q factor is not within the desired Q factor range (Block 175), the tuning controller 143 performs ferromagnetic change iterations until an updated Q factor is within the desired Q factor range. When the initial Q factor is not within the desired Q factor range (Block 175), the tuning controller 143 cooperates with the mass changing device 148 to change the ferromagnetic mass of the actuator housing 141.

Where it has been determined that the ferromagnetic mass is to be increased (Block 178), the tuning controller 143 cooperates with the mass changing device 148 to add ferromagnetic mass, for example in the form of a ferromagnetic body to the actuator housing 141 (Block 180). Ferromagnetic mass may be added to the top 151 and/or bottom 152 of the actuator housing 141, which may include ferromagnetic material. The corresponding mass changing device 148 may be a device that positions and secures ferromagnetic bodies to the actuator housing 141, for example, at a given location, for example, the corners, that may affect the ferromagnetic mass to more closely achieve the desired Q factor. Of course, ferromagnetic mass may be added anywhere on the actuator housing 141.

Where it has been determined that the initial ferromagnetic mass is to be decreased (Block 178), the tuning controller 143 cooperates with the mass changing device 148 to remove ferromagnetic mass from the actuator housing 141 (Block 182). The corresponding mass changing device 148 may be a laser, for example, for laser ablating portions of the actuator housing 141. Ferromagnetic mass may be removed at a given location that may affect the ferromagnetic mass to more closely achieve the desired Q factor, for example, from the top 151 and/or bottom 152 of the actuator housing 141, which may include ferromagnetic material. The portions of the actuator housing 141 to be laser ablated may be predetermined, for example, the corners of the actuator housing. Of course, ferromagnetic mass may be removed from anywhere on the actuator housing 141.

In some embodiments, ferromagnetic mass may be added to one side or portion of the actuator housing 141 while ferromagnetic mass may be removed from another side or portion of the actuator housing to achieve the desired Q factor.

Each iteration also includes, at Block 184, determining, using the tuning controller 143, the updated Q factor of the haptic actuator 140 based upon the changing of the ferromagnetic mass of the actuator housing 141. At Block 186, each iteration also includes determining, using the tuning controller 143, whether the updated Q factor is within the desired Q factor range. If the updated Q factor is within the desired Q factor range (Block 186), the method ends at Block 188. Otherwise, if the updated Q factor is not within the desired Q factor range, another iteration is performed (Block 178) including changing the ferromagnetic mass of the actuator housing 141 (Blocks 180, 182), determining another updated Q factor of the haptic actuator based upon the further changing of the ferromagnetic mass of the actuator housing 141 (Block 184), and determining whether the further updated Q factor is within the desired Q factor range (Block 186). It should be understood that, with each iteration, ferromagnetic mass may be added or removed at a different location. For example, if ferromagnetic mass is to be added, each iteration may add a fixed size ferromagnetic body at different locations (e.g., on the corners, top, and/or bottom) on the actuator housing 141. Alternatively, if ferromagnetic mass is to be removed, segments of a fixed size may be removed from different locations (e.g., on the corners, top, and/or bottom) on the actuator housing 141. The process or iterations continue until the Q factor is within the desired Q factor range. The method ends at Block 188.

Figure 11:
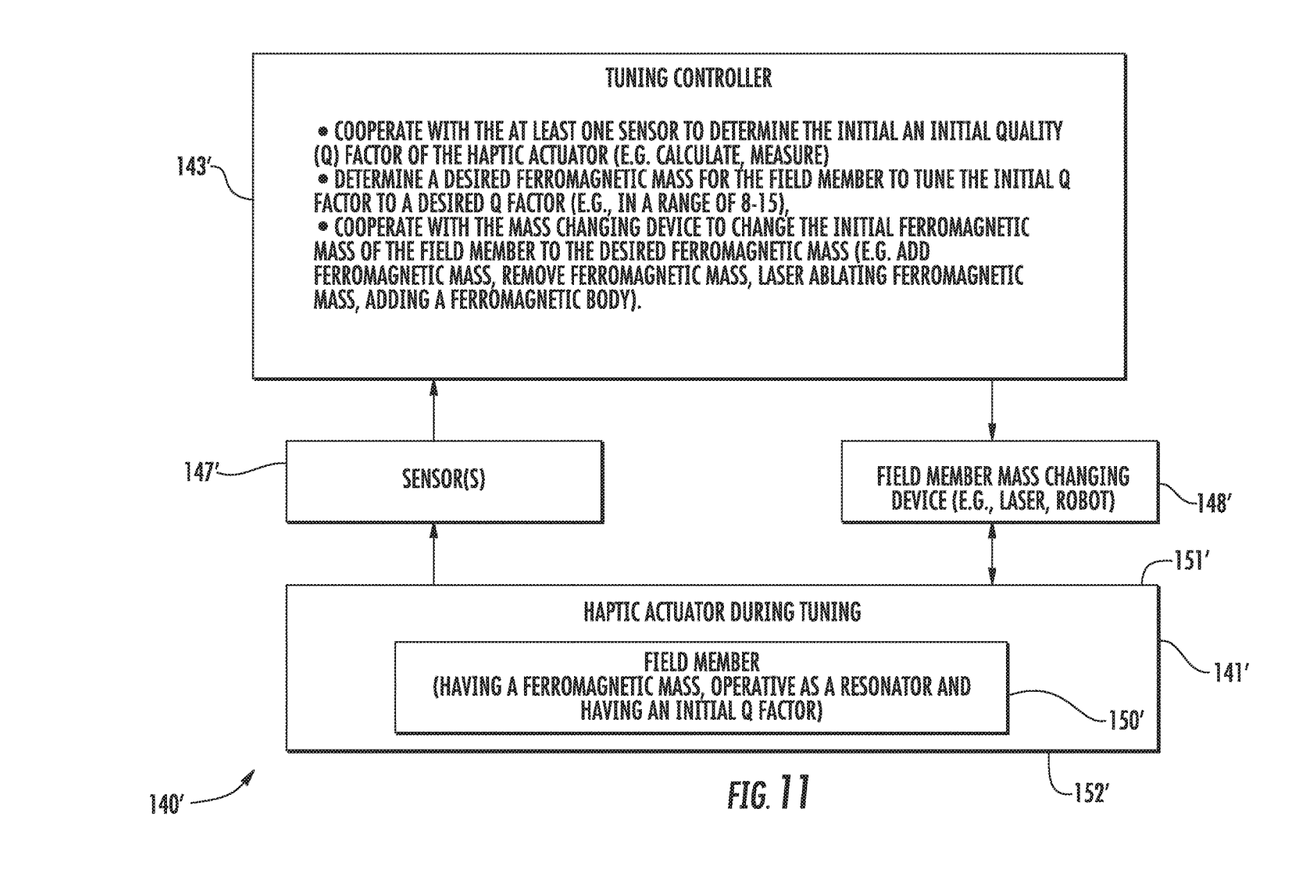
FIG. 11 is a schematic block diagram of an apparatus for tuning a haptic actuator according to another embodiment.
Figure 12:
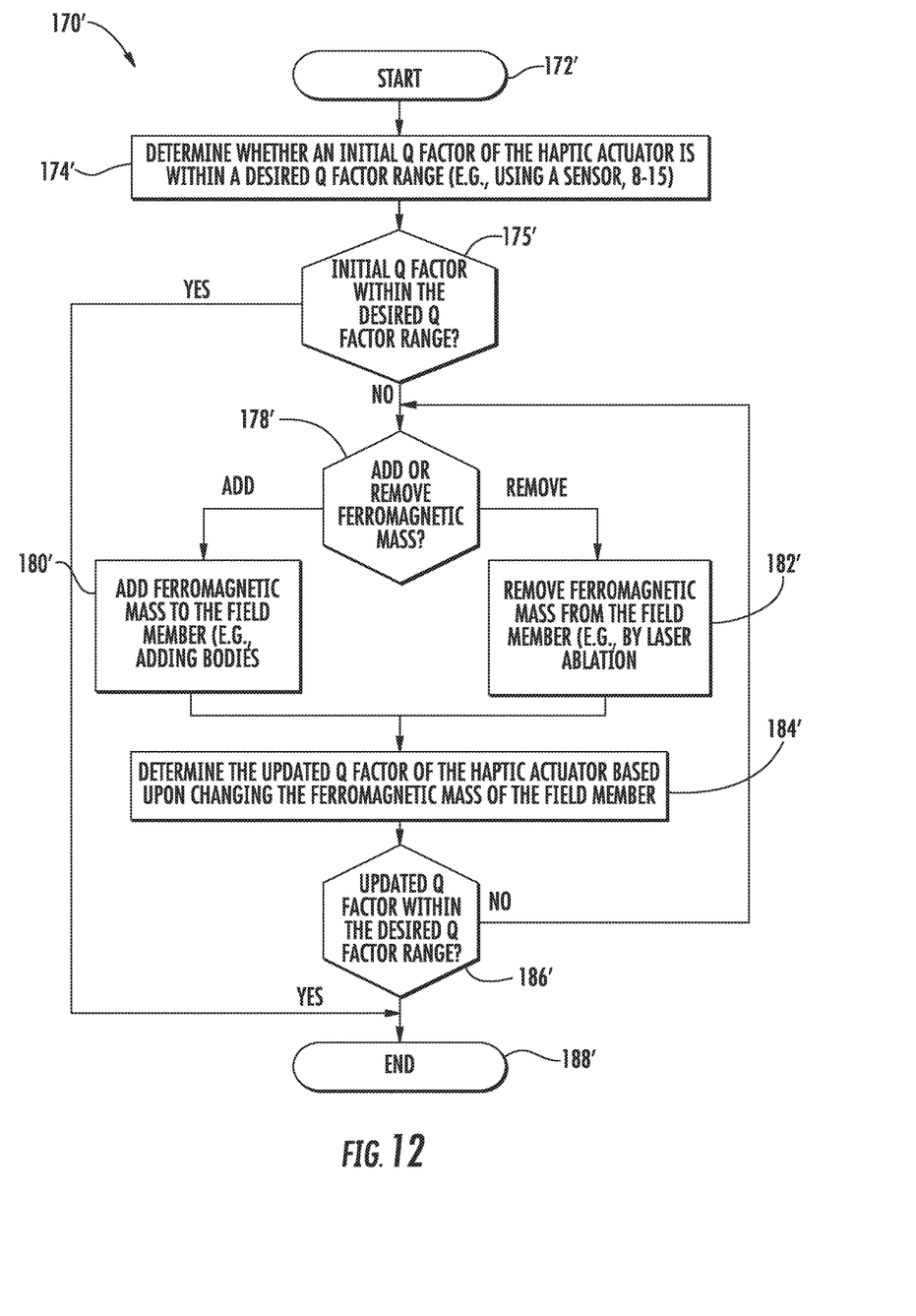
FIG. 12 is a flow diagram illustrating a method of tuning a haptic actuator using the apparatus of FIG. 11.

Referring now additionally to FIG. 11 and the flowchart 170' in FIG. 12, another apparatus and method for tuning the haptic actuator 140' to a desired Q factor, for example, post-assembly, will now be described. Beginning at Block 172', the method includes, at Block 174', determining whether the initial Q factor of the haptic actuator 140' is within a desired Q factor range. This may be done with a sensor 147' coupled to a tuning controller 143'. The sensor 147' may measure one or more parameters of the haptic actuator 140' which may be used by the tuning controller 143' to calculate the initial Q factor. More than one sensor 147' may be used to determine the initial Q factor.

The desired Q factor range may be predetermined based upon the type of haptic actuator, for example. The desired Q factor may be between 8 and 15, for example. Other Q factor ranges may be desired, for example, based upon the type, shape, and application of the haptic actuator.

If the initial Q factor is not within the desired Q factor range (Block 175'), the tuning controller 143' performs ferromagnetic change iterations until an updated Q factor is within the desired Q factor range. When the initial Q factor is not within the desired Q factor range (Block 175'), the tuning controller 143' cooperates with the mass changing device 148' to change the ferromagnetic mass of the field member 150' to the desired ferromagnetic mass.

Where it has been determined that the ferromagnetic mass of the field member 150' is to be increased (Block 178'), the tuning controller 143' cooperates with the mass changing device 148' to add ferromagnetic mass, for example in the form of a ferromagnetic body to the field member 150' (Block 182'). The corresponding mass changing device 148' may be a device that positions and secures ferromagnetic bodies to the field member 150', for example, at a given location that may affect the ferromagnetic mass to more closely achieve the desired Q factor. Of course, ferromagnetic mass may be added anywhere on the field member 150'.

Where it has been determined that the initial ferromagnetic mass is to be decreased (Block 178'), the tuning controller 148' cooperates with the mass changing device 143' to remove ferromagnetic mass, for example, in a given location from the field member 150' (Block 182'). The corresponding mass changing device 148' may be a laser, for example, for laser ablating portions of the field member 150'. Ferromagnetic mass may be removed at a given location that may affect the ferromagnetic mass to more closely achieve the desired Q factor. Each portion of the field member 150' to be laser ablated may be predetermined, for example, the corners of the field member. Of course, ferromagnetic mass may be removed from anywhere on the field member 150'.

Each iteration also includes, at Block 184', determining, using the tuning controller 143', the updated Q factor of the haptic actuator 140' based upon the changing of the ferromagnetic mass of the field member 150'. At Block 186', each iteration also includes determining, using the tuning controller 143', whether the updated Q factor is within the desired Q factor range. If the updated Q factor is within the desired Q factor range (Block 186'), the method ends at Block 188'. Otherwise, if the updated Q factor is not within the desired Q factor range, another iteration is performed (Block 178') including changing the ferromagnetic mass of the field member 150' (Blocks 180', 182'), determining another updated Q factor of the haptic actuator based upon the further changing of the ferromagnetic mass of the field member 150' (Block 184'), and determining whether the further updated Q factor is within the desired Q factor range (Block 186'). It should be understood that, with each iteration, ferromagnetic mass may be added or removed at a different location on the field member 150'. For example, if ferromagnetic mass is to be added, each iteration may add a fixed size ferromagnetic body at different locations on the field member 150'. Alternatively, if ferromagnetic mass is to be removed, segments of a fixed size may be removed from different locations on the field member 150'. The process or iterations continue until the Q factor is within the desired Q factor range. The method ends at Block 188'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of tuning a haptic actuator comprising a housing having an initial ferromagnetic mass, at least one coil carried by the housing, and a field member movable within the housing responsive to the at least one coil, the haptic actuator operative as a resonator and having an initial quality (Q) factor, the method comprising:
   determining the initial Q factor of the haptic actuator;
   determining a desired ferromagnetic mass for the housing to tune the initial Q factor to a desired Q factor; and
   changing the initial ferromagnetic mass of the housing to the desired ferromagnetic mass.

2. The method of claim 1 wherein changing the initial ferromagnetic mass of the housing comprises adding ferromagnetic mass to the housing.

3. The method of claim 1 wherein changing the initial ferromagnetic mass of the housing comprises removing ferromagnetic mass from the housing.

4. The method of claim 3 wherein removing ferromagnetic mass from the housing comprises laser ablating ferromagnetic mass from the housing.

5. The method of claim 1 wherein changing the initial ferromagnetic mass of the housing comprises adding a ferromagnetic body to the housing.

6. The method of claim 1 wherein the desired Q factor is in a range between 8 and 15.

7. The method of claim 1 wherein the housing has a top and a bottom; and wherein changing the initial ferromagnetic mass of the housing comprises changing the initial mass of one of the top and bottom of the housing to the desired ferromagnetic mass.

8. The method of claim 1 wherein the field member comprises at least one permanent magnet and at least one mass coupled thereto.

9. A method of tuning a haptic actuator comprising a housing, at least one coil carried by the housing, and a field member movable within the housing responsive to the at least one coil having an initial ferromagnetic mass, the haptic actuator operative as a resonator and having an initial quality (Q) factor, the method comprising:
   determining the initial Q factor of the haptic actuator;
   determining a desired ferromagnetic mass for the field member to tune the initial Q factor to a desired Q factor; and
   changing the initial ferromagnetic mass of the field member to the desired ferromagnetic mass.

10. The method of claim 9 wherein changing the initial ferromagnetic mass of the field member comprises adding ferromagnetic mass to the field member.

11. The method of claim 9 wherein changing the initial ferromagnetic mass of the field member comprises removing ferromagnetic mass from the field member.

12. The method of claim 11 wherein removing ferromagnetic mass from the field member comprises laser ablating ferromagnetic mass from the field member.

13. The method of claim 9 wherein changing the initial ferromagnetic mass of the field member comprises adding a ferromagnetic body to the field member.

14. The method of claim 9 wherein the desired Q factor is in a range between 8 and 15.

15. An apparatus for tuning a haptic actuator comprising a housing having an initial ferromagnetic mass, at least one coil carried by the housing, and a field member movable within the housing responsive to the at least one coil, the haptic actuator operative as a resonator and having an initial quality (Q) factor, the apparatus comprising:
   at least one sensor;
   a mass changing device; and
   a controller capable of
      cooperating with the at least one sensor to determine the initial quality (Q) factor of the haptic actuator,
      determining a desired ferromagnetic mass for the housing to tune the initial Q factor to a desired Q factor, and
      cooperating with the mass changing device to change the initial ferromagnetic mass of the housing to the desired ferromagnetic mass.

16. The apparatus of claim 15 wherein the mass changing device is capable of changing the initial ferromagnetic mass of the housing by adding ferromagnetic mass to the housing.

17. The apparatus of claim 15 wherein the mass changing device is capable of changing the initial ferromagnetic mass of the housing by removing ferromagnetic mass from the housing.

18. The apparatus of claim 17 wherein the mass changing device is capable of removing ferromagnetic mass from the housing by laser ablating ferromagnetic mass from the housing.

19. The apparatus of claim 15 wherein the mass changing device is capable of changing the initial ferromagnetic mass of the housing by adding a ferromagnetic body to the housing.

20. The apparatus of claim 15 wherein the mass changing device is capable of changing the initial ferromagnetic mass of the housing to the desired ferromagnetic mass so that the desired Q factor is in a range between 8 and 15.

21. An apparatus for tuning a haptic actuator comprising a housing, at least one coil carried by the housing, and a field member movable within the housing responsive to the at least one coil and having an initial ferromagnetic mass, the haptic actuator operative as a resonator and having an initial quality (Q) factor, the apparatus comprising:
   at least one sensor;
   a mass changing device; and
   a controller capable of
      cooperating with the at least one sensor to determine the initial quality (Q) factor of the haptic actuator,
      determining a desired ferromagnetic mass for the field member to tune the initial Q factor to a desired Q factor, and
      cooperating with the mass changing device to change the initial ferromagnetic mass of the field member to the desired ferromagnetic mass.

22. The apparatus of claim 21 wherein the mass changing device is capable of changing the initial ferromagnetic mass of the field member by adding ferromagnetic mass to the field member.

23. The apparatus of claim 21 wherein the mass changing device is capable of changing the initial ferromagnetic mass of the housing by removing ferromagnetic mass from the housing.

24. The apparatus of claim 23 wherein the mass changing device is capable of removing ferromagnetic mass from the field member by laser ablating ferromagnetic mass from the housing.

25. The apparatus of claim 23 wherein the mass changing device is capable of changing the initial ferromagnetic mass of the field member by adding a ferromagnetic body to the field member.

26. The apparatus of claim 21 wherein the mass changing device is capable of changing the initial ferromagnetic mass of the field member to the desired ferromagnetic mass so that the desired Q factor is in a range between 8 and 15.

* * * * *